United States Patent
Stiller

(10) Patent No.: US 8,219,262 B2
(45) Date of Patent: Jul. 10, 2012

(54) MOTOR VEHICLE EQUIPPED WITH A PNEUMATIC LEVEL CONTROL SYSTEM

(75) Inventor: Alexander Stiller, Garbsen (DE)

(73) Assignee: Continental Aktiengesellschaft, Hannover (DE)

( * ) Notice: Subject to any disclaimer, the term of this patent is extended or adjusted under 35 U.S.C. 154(b) by 1227 days.

(21) Appl. No.: 11/919,014

(22) PCT Filed: Apr. 8, 2006

(86) PCT No.: PCT/EP2006/003223
§ 371 (c)(1),
(2), (4) Date: Oct. 22, 2007

(87) PCT Pub. No.: WO2006/111282
PCT Pub. Date: Oct. 26, 2006

(65) Prior Publication Data
US 2009/0082922 A1    Mar. 26, 2009

(30) Foreign Application Priority Data
Apr. 21, 2005 (DE) .......................... 10 2005 018 434

(51) Int. Cl.
*B60G 17/052* (2006.01)

(52) U.S. Cl. ............. 701/1; 701/37; 701/48; 701/29.1; 280/5.5; 280/5.502; 280/5.503; 280/5.506; 280/5.507; 280/5.512; 280/6.153; 280/47.33

(58) Field of Classification Search ................ 701/1, 70, 701/82, 91; 267/136–141; 298/17 S
See application file for complete search history.

(56) References Cited

U.S. PATENT DOCUMENTS

| | | | | |
|---|---|---|---|---|
| 3,917,309 A * | 11/1975 | Hegel et al. | ................. | 280/6.157 |
| 4,193,026 A * | 3/1980 | Finger et al. | ................... | 324/428 |
| 4,236,074 A * | 11/1980 | Chen | ................................ | 701/37 |
| 4,349,077 A * | 9/1982 | Sekiguchi et al. | .............. | 180/41 |
| 4,401,310 A * | 8/1983 | Ishikawa et al. | ........... | 280/6.158 |
| 4,540,188 A * | 9/1985 | Meloche et al. | ............ | 280/6.158 |
| 4,568,093 A * | 2/1986 | Shimizu et al. | ............ | 280/6.159 |
| 4,568,096 A * | 2/1986 | Yew et al. | ................... | 280/6.158 |
| 4,640,526 A * | 2/1987 | Tanaka et al. | ............... | 280/6.158 |
| 4,700,303 A * | 10/1987 | Tokuyama et al. | ............. | 701/39 |
| 4,767,126 A * | 8/1988 | Bois et al. | ................... | 280/6.151 |
| 4,909,536 A * | 3/1990 | Hale | .......................... | 280/6.157 |
| 5,014,199 A * | 5/1991 | Konishi et al. | ................... | 701/37 |
| 5,130,927 A * | 7/1992 | Kunishima et al. | ............. | 701/39 |
| 5,176,391 A * | 1/1993 | Schneider et al. | .......... | 280/6.153 |
| 5,220,505 A * | 6/1993 | Yokote et al. | .................... | 701/37 |
| 5,228,704 A * | 7/1993 | Tabe | .......................... | 280/6.16 |
| 5,312,119 A * | 5/1994 | Schneider et al. | .......... | 280/766.1 |
| 5,452,919 A * | 9/1995 | Hoyle et al. | ................. | 280/5.514 |
| 5,484,162 A * | 1/1996 | Kanoh et al. | ................ | 280/6.157 |
| 5,517,847 A * | 5/1996 | Campbell et al. | ............ | 73/11.07 |
| 5,775,448 A * | 7/1998 | Hirahara et al. | ............ | 180/24.02 |
| 5,890,721 A * | 4/1999 | Schneider et al. | .......... | 280/6.153 |
| 5,915,700 A * | 6/1999 | Schneider et al. | .......... | 280/6.153 |
| 6,066,899 A * | 5/2000 | Rund et al. | .................... | 307/10.7 |

(Continued)

*Primary Examiner* — Jonathan M Dager

(57) ABSTRACT

Disclosed is a pneumatic level control system equalizer of a motor vehicle equipped with a battery and a generator supplying the battery, as well as a compressor driven by an electric motor and associated with the level control system equalizer, the electric motor of the compressor being only supplied with electric current by the vehicle battery and/or generator in certain conditions. The power requirements of the level control system equalizer can be pre-evaluated for a change of level and/or a filling of the pressure tank to be performed.

13 Claims, 2 Drawing Sheets

U.S. PATENT DOCUMENTS

| | | | |
|---|---|---|---|
| 6,171,065 B1 | 1/2001 | Wode | |
| 6,176,495 B1* | 1/2001 | Decker | 280/6.153 |
| 6,224,103 B1* | 5/2001 | Hatcher | 280/766.1 |
| 6,293,562 B1* | 9/2001 | Kutscher | 280/6.159 |
| 6,351,696 B1* | 2/2002 | Krasny et al. | 701/50 |
| 6,362,599 B1* | 3/2002 | Turner et al. | 320/135 |
| 6,428,024 B1* | 8/2002 | Heyring et al. | 280/124.106 |
| 6,584,385 B1* | 6/2003 | Ford et al. | 701/36 |
| 6,646,845 B1* | 11/2003 | Turner et al. | 361/86 |
| 6,752,402 B2* | 6/2004 | Grotendorst et al. | 280/6.152 |
| 7,025,361 B1* | 4/2006 | Erickson | 280/6.153 |
| 7,744,099 B2* | 6/2010 | Holbrook | 280/6.153 |
| 2001/0005803 A1 | 6/2001 | Cochofel et al. | 701/1 |
| 2002/0035423 A1* | 3/2002 | Shank et al. | 701/37 |
| 2002/0111756 A1* | 8/2002 | Modgil | 702/63 |
| 2003/0155164 A1* | 8/2003 | Mantini et al. | 180/209 |
| 2003/0195668 A1* | 10/2003 | Radtke et al. | 701/1 |
| 2004/0044443 A1* | 3/2004 | Eriksson | 701/1 |
| 2004/0061293 A1* | 4/2004 | Barbison | 280/6.154 |
| 2004/0084232 A1* | 5/2004 | Obayashi | 180/65.2 |
| 2004/0178756 A1* | 9/2004 | Zhenxing | 318/432 |
| 2004/0256815 A1* | 12/2004 | Eichhorn et al. | 280/6.155 |
| 2005/0010343 A1* | 1/2005 | Misawa | 701/37 |
| 2005/0110229 A1* | 5/2005 | Kimura et al. | 280/5.514 |
| 2005/0110498 A1* | 5/2005 | Plett | 324/433 |
| 2005/0161891 A1* | 7/2005 | Trudeau et al. | 280/5.507 |
| 2005/0189918 A1* | 9/2005 | Weisgerber et al. | 320/132 |
| 2005/0228553 A1* | 10/2005 | Tryon | 701/22 |
| 2005/0236781 A1* | 10/2005 | Brookes et al. | 280/5.507 |
| 2006/0082078 A1* | 4/2006 | Luke | 280/6.151 |
| 2006/0164223 A1* | 7/2006 | Gilbert et al. | 340/438 |
| 2007/0120334 A1* | 5/2007 | Holbrook | 280/6.157 |
| 2007/0170679 A1* | 7/2007 | Stender et al. | 280/124.16 |
| 2007/0246902 A1* | 10/2007 | Trudeau et al. | 280/6.16 |
| 2010/0052272 A1* | 3/2010 | Beilmann | 280/6.16 |

* cited by examiner

MOTOR VEHICLE EQUIPPED WITH A PNEUMATIC LEVEL CONTROL SYSTEM

BACKGROUND OF THE INVENTION

The present invention relates to a pneumatic level control system in a motor vehicle, which latter comprises a vehicle battery and a generator supplying the vehicle battery, and an electrically operated compressor with an electric motor, which compressor is assigned to the level control system, the electric motor of the compressor being supplied with power by the vehicle battery and/or the generator only under certain conditions.

Various level control systems for motor vehicles are known from the prior art. Thus, for instance, a motor vehicle is known from DE3601176C1 which has a pneumatic level control system supplied by an electrically operated compressor. In order to prevent the battery from becoming prematurely exhausted, which is a concern in the case of constant supply of the compressor with electrical energy via the battery of the motor vehicle, the compressor is operated, in the case of a stationary internal combustion engine and upon reaching or falling below a lower level limit value, only when the trunk of the motor vehicle is open.

This has the disadvantage that, if a motor vehicle with level control system is loaded in some other way, for example through the front passenger or a rear side door, the vehicle may find itself leaning to one side, a situation which is not then corrected while stationary. Furthermore, despite this restriction there is still a risk of the battery of the motor vehicle being very heavily loaded, and possibly overloaded, by the level control system in the event of level compensation when the trunk lid is open, so leaving other safety-relevant systems with insufficient energy available to them.

The object of the invention is therefore to avoid overloading the vehicle battery of the motor vehicle through operation of the level control system.

SUMMARY OF THE INVENTION

According to the invention, the energy requirement of the level control system for a pending level change and/or a pending pressure accumulator filling operation is determined in advance. If the level control system detects that the motor vehicle is leaning by an amount outside the admissible limits or a level change is requested by the vehicle driver or automatically or a pressure accumulator filling operation is initiated, the necessary energy requirement of the level control system for establishing the required set level is determined before the level control system is brought into operation. First of all, the amount of air required for the level change is determined by known methods. The necessary energy requirement may be determined from the time characteristic of the electrical input power of the compressor for transfer of the necessary quantity of air into the air springs and/or the compressed air accumulator and from the time characteristic of the power consumption of the individual valves to be operated, since the relationship between the electrical input power of the compressor and the delivered volumetric flow rate at a corresponding compressor back pressure, the so-called pressure/volumetric flow rate characteristic, is known.

The advantage is that, even before the level control system is brought into operation for a pending level change, the effect of the level change in terms of energy on the vehicle battery may be determined and may be taken into account upon the level change or for operation of at least one further electrical vehicle system.

According to a further development of the invention, the pending level change and/or the pending pressure accumulator filling operation is performed by the pneumatic level control system only when the present energy status of the vehicle battery less the energy requirement of the pending level change and/or the pending pressure accumulator filling operation exceeds at least a first threshold value. The threshold value should be so set that at least minimum, safety-relevant operation of the motor vehicle is ensured above the threshold value. Preferably, the threshold value may also be so set that, above the threshold value, all the vehicle systems relevant to vehicle operation are operable. The advantage of the further development is that the level change is performed only when the vehicle battery will not be overloaded thereby and the motor vehicle will remain operable. Thus, trouble-free operation of at least the vehicle systems of a motor vehicle with a level control system, such as for example door locking systems or starting systems or safety-relevant braking or steering systems, is always ensured after a level change.

According to a further development, the first threshold value is additionally determined taking into account the energy supplied to the vehicle battery. The advantage is that, when determining the threshold value, not only is the present charge of the vehicle battery taken into account but also the energy supplied to the vehicle battery by the generator when the internal combustion engine is running, which increases the availability of the level control system and thus traveling comfort.

According to a preferred embodiment, the first threshold value is additionally determined taking into account the present and/or future energy requirement of at least one further electrical energy consumer of the motor vehicle. The advantage is that the electrical input power of further vehicle systems, such as for example braking systems, steering systems or lighting systems, may also be taken into account when determining the threshold value and thus overloading of the vehicle battery by the monitored vehicle systems may be avoided and operation of at least the safety-relevant vehicle systems of the motor vehicle after possible operation of the level control system may be ensured.

According to an embodiment, a plurality of threshold value limits are present, the pneumatic level control system having only limited functionality above the first threshold value and below a second threshold value. Advantageously, a plurality of threshold values are defined, with only the level control functions of great relevance to safety, such as for example compensation of a leaning position to bring about for example an intermediate level or merely lowering of the level at elevated vehicle speeds or the like, being functional above a first and below a second threshold value. Above a second threshold value, all the functions of the level control system may then be selected and carried out.

However, it is also possible to define a third or further threshold value, in order for example to make possible further less safety-relevant functions of the level control system, such as for example pumping up to the normal level of the vehicle, above a second and below a possible third threshold value, only enabling and making practicable all the functions of the level control system above the third or a further threshold value.

According to an embodiment, an intermediate level, lying between a desired set level and the present vehicle level, is actuated, such that the energy status of the vehicle battery exceeds a first threshold value once the intermediate level has been reached. The advantage of the further development is that, although the charge of the vehicle battery does not allow a complete level change from the present vehicle level to the set level of the vehicle, a partial level change is performed in the desired level adjustment direction, without the vehicle battery being overloaded. The vehicle level is here either increased successively and the charge of the vehicle battery is checked successively or alternatively a vehicle level is actuated in advance in terms of the admissible energy consumption of the level control system without reaching or falling below the threshold value. In this case, the maximum admissible energy requirement of the level control system is preferably determined and then the maximum possible vehicle level which comes closest to the set level is established without the vehicle battery being overloaded thereby.

According to an embodiment as, the battery voltage, the battery current or the battery power is used as the threshold value. The advantage is that the battery voltage, the battery current or the battery power, being the product of the battery voltage and battery current, may be measured and/or calculated with simple means or may be transmitted via a communication line, such as for example a CAN bus, from the control unit of the battery vehicle system to the control unit of the level control system.

According to an embodiment, the energy status of the vehicle battery is determined and stored once the vehicle engine has been turned off, for a third threshold value to be fixable with reference to the energy status for the energy requirement admissible for the level control system, and for the sum of the energy consumed by the level control system for the level changes and/or pressure accumulator filling operations performed since the vehicle engine was turned off and of the energy requirement necessary for the pending level change and/or the pending pressure accumulator filling operation to lie below the third threshold value. The advantage is that a defined maximum energy requirement to be consumed is allotted to the level control system when the motor vehicle is stationary and the internal combustion engine is switched off, the latter normally also driving the battery generator. This may be dependent on the vehicle battery charge.

With this maximum energy requirement to be consumed (third threshold value), a specific number of level changes and/or pressure accumulator filling operations may be performed when the internal combustion engine is switched off. Advantageously, the third threshold value is adjusted to match further vehicle systems and their energy requirements available in future when the internal combustion engine is switched off, such that the motor vehicle always remains operable and each vehicle system may perform a specific number of functions and the vehicle battery is not discharged by just one individual vehicle system. Operable means that at least the optionally electrically operated door locking system remains functional and the motor vehicle may be started with the assistance of a starter supplied with energy by the vehicle battery.

The invention is explained hereinafter with reference to the drawing.

DETAILED DESCRIPTION OF THE DRAWING

Figure 1:
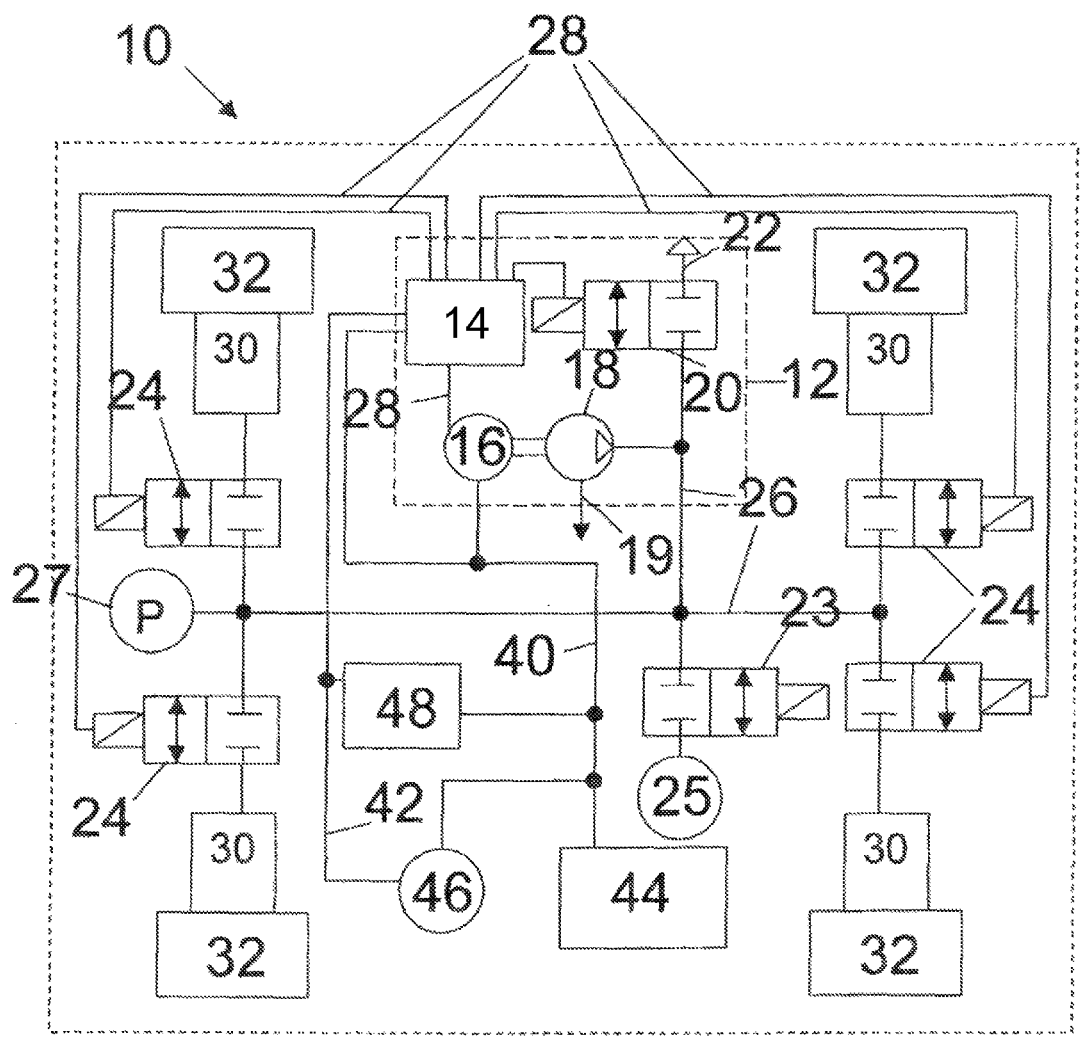
FIG. 1 shows a block diagram for carrying out the invention.

FIG. 1 shows, in schematically highly simplified form, a motor vehicle 10 with a level control system 12, a vehicle battery 44, a generator 46 and at least one further vehicle system 48. The motor vehicle 10 furthermore comprises four individual wheels 32 and a spring suspension unit 30 assigned to each of these wheels 32, preferably an air spring or an air spring strut consisting of air spring and shock absorber. Each of the spring suspension units 30 is connected via a connecting line 26 to a compressor 18 and to a 2/2 way valve 24 closing the connecting line in the normal state and opening it in the connected state. Furthermore, air may be passed from the spring suspension units 30 via the connecting line 26 and, in the case of an open valve 24 and an open drain valve 20, via the outlet line 22 into the atmosphere, in order to reduce the level of the vehicle.

A further 2/2 way valve 23 shuts off connection of a pressure accumulator 25 from the connecting line 26 in its normal state and connects the pressure accumulator 25 to the connecting line 26 in a second control state. The pressure level in the pressure accumulator 25 may be raised in that an electric motor 16 of the compressor 18 is operated and the compressor 18 draws in air from the atmosphere via the intake line 19, compresses it and feeds it via the connecting line 26 and open valve 23 to the pressure accumulator, the pressure level of the pressure accumulator 25 being substantially higher than the pressure level in the spring elements 30 in order optionally to transfer compressed air from the pressure accumulator 25 into the spring elements 30.

The vehicle level may be raised in that an electric motor 16 of the compressor 18 is operated and the compressor 18 draws in air from the atmosphere via the intake line 19, compresses it and feeds it via the connecting line 26 and open valve 24 to the respective spring suspension unit 30 or the valve of the pressure accumulator 25 is opened until the desired vehicle level is reached. In the process, vehicle height may be detected by height sensors, which are not shown. The signals from the height sensors are then fed to the control unit 14 of the level control system 12 for example via a communication line 42 and processed in the control unit 14. The control unit 14 of the level control system 12 then actuates the corresponding components, such as for example electric motor 16, valves 24 or drain valve 20 via a respective control line 28, in order to establish the required vehicle height.

Figure 2:
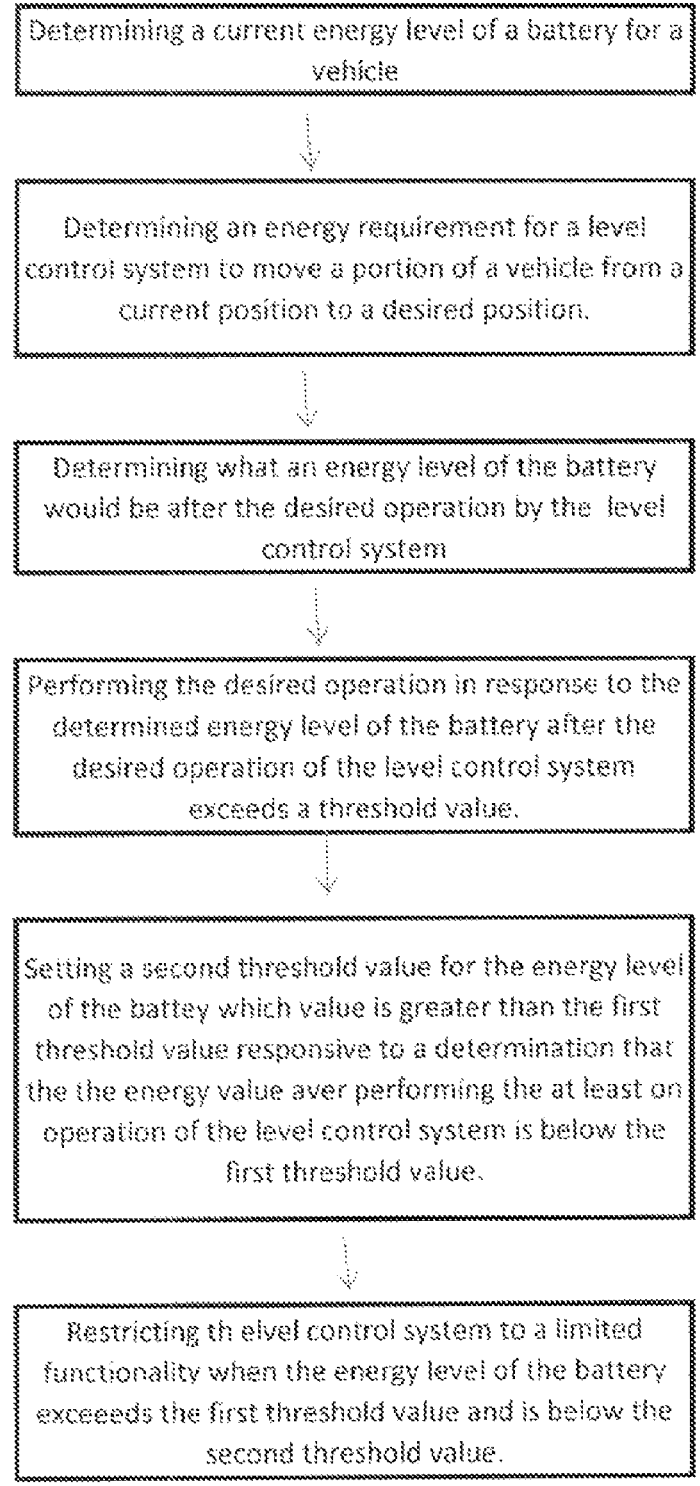
FIG. 2 shows a flow chart of a process for carrying out the disclosed example method.

Referring to FIG. 2 with continued reference to FIG. 1, in order not to overload the vehicle battery 44 by a level control operation, be it pumping up or draining, according to the invention the energy requirement of the level control system for establishing the required height level is determined prior to each level control operation. To this end, the amount of air necessary for the level control operation is determined by the control unit 14 using methods known per se, in that for example the necessary air volume is determined as the product of the required height alteration and the known air spring cross-section and multiplied by the pressure in the respective spring suspension unit 30 determined by a pressure sensor 27. The electrical power which the electric motor 16 of the compressor would consume when establishing the required vehicle level, together with the time characteristic thereof, is known from the delivery characteristic, known per se, of the compressor, which contains the following key indicators: volumetric flow rate, back pressure and current profile over time. In this way, the duration of the required level control operation and the average electrical power consumption of the electric motor 16 are obtained in advance at least in simplified form.

Estimation of the energy requirement may be determined each time prior to a level control operation by the control unit 14 of the level control system 12 or values determined empirically or computationally for the corresponding level change may be stored and saved in advance in the control unit 14. This estimation may cover the worst-case energy requirement scenario for the respective level change, e.g. from the lowest level to the highest level. In this respect, a stored value needs to be provided in the normal case for each possible level change, e.g. low level to normal level, low level to high level or normal level to high level and vice versa. The number of stored values follows the number of height levels of the level control system 12. By using stored values, estimation of the energy requirement is simpler to implement and quicker to perform in the control unit 14.

In order to be able to perform more precisely the estimation of the energy requirement of the level control system 12 for the pending level control operation, the electrical power of the valves 20, 24 to be switched and optionally of the pressure sensor 27 may additionally be calculated over the calculated duration of the required level control operation. The sum of all the individual electrical power consumers of the level control system then represents the entire energy requirement for the required level control operation. Because the electrical power consumption of the valves 20, 24 is negligible compared to the electrical power consumption of the electric motor 16, determination of the former may optionally be dispensed with.

In the event of a drain operation, i.e. a level reduction, it may be the case with certain level control systems 12 that operation of the compressor 28 is unnecessary, such that the energy requirement of the level control system 12 for a required level compensation may then consist in this case merely of the electrical power consumption of the valves 20, 24, the pressure sensor 27 and optionally further components of the level control system 12 which are not shown.

The control unit 14 of the level control system 12 always determines the present charge of the vehicle battery 44 via a measuring line 40. The present charge of the vehicle battery 44 is measured, for example, via the present voltage value between the plus and minus poles of the vehicle battery. Due to the present voltage value of the vehicle battery 44 and the known power level of the vehicle battery, for example in ampere-hours (Ah), the present charge and the amount of energy currently available from the vehicle battery may be determined.

This currently available amount of energy of the vehicle battery 44 less the energy requirement of the level control system 12 for the pending level control operation gives rise to the amount of energy of the vehicle battery 44 available after the level control operation. In order not to impair the functionality of the motor vehicle 10, in particular of safety-relevant vehicle systems, by a level control operation of the level control system 12 and not to overload the vehicle battery 44, the required level control operation of the control unit 14 is only initiated if the amount of energy of the vehicle battery 44 available after the level control operation exceeds a threshold value. Prior to carrying out each level control operation, the control unit 14 thus checks that the vehicle battery 44 would not be overloaded by this pending level control operation, i.e. would reach or fall below a threshold value. Only if this is not the case is the level control operation performed.

When the vehicle is stationary, i.e. when the engine of the vehicle and thus also the generator 46 of the vehicle is not operating, a maximum limit may additionally be set for the amount of energy available for the level control system 12. This may proceed in the form of a previously defined further limit value stored in the control unit 14 or a maximum admissible number of level control operations of the level control system 12 until the vehicle or generator 46 is next operated, wherein, before the number of level control operations already performed is reset to zero, the generator 46 should operate for more than a given minimum time. The maximum admissible number of level changes may be permanently stored in the control unit 14, irrespective of the level change that has taken place and the energy consumption that has taken place, or alternatively varied as a function of the level change that has taken place and of the energy consumption that has taken place within a fixed range (maximum admissible energy consumption).

Moreover, the control unit 14 of the level control system 12 is connected via a communication line 42 to a generator 46, which charges the vehicle battery 44 when the internal combustion engine of the motor vehicle 10 is running, and at least one further vehicle system 48 and determines the energy supplied thereby to the vehicle battery 44 or the energy consumed thereby from the vehicle battery and takes this into account when determining the present or future charge and energy status of the vehicle battery 44.

A plurality of threshold values may also be defined in the control unit 14, wherein, below each further threshold value, ever fewer functions of the level control system 12 may be performed. Below the lowest threshold value, the level control system 12 is made completely non-operational, for example. Above the lowest and below a further threshold value, for example only safety-relevant functions, such as compensation of a leaning position or draining for the purpose of lowering from an elevated vehicle level, may be performed. In this way, a plurality of threshold values can be linked with specific defined functions of the level control system 12. In this context, it is also possible for an intermediate level, which lies between the present level and the new required set level of the motor vehicle 10, to be calculated and established by the control unit 14 of the level control system 12, such that the corresponding threshold value is not fallen below or reached, which in this case would happen on actuation of the new required set level since the energy requirement of the level control system 12 would be too high and would overload the vehicle battery 44.

LIST OF REFERENCE NUMERALS (Part of the Description)
10 Motor vehicle
12 Level control system
14 Control unit
16 Electric motor
18 Compressor
19 Intake line
20 Drain valve
22 Drain line
23 Valve
24 Valve
25 Pressure accumulator
26 Line
27 Pressure sensor
28 Control line
30 Spring suspension unit
32 Wheel
40 Measuring line
42 Communication line
44 Vehicle battery
46 Generator
48 Vehicle system

The invention claimed is:

1. A pneumatic level control system (12) in a motor vehicle (10) having a vehicle battery (44) and a generator (46) supplying the vehicle battery (44), and an electrically operated compressor (18) with an electric motor (16), which compressor is assigned to the level control system (12), the electric motor (16) of the compressor (18) being supplied with power by the vehicle battery (44) and/or the generator (46) only under certain conditions, wherein a controller controls operation of the level control system (12) based on an energy requirement of the level control system (12) for at least one pending operation is estimated in advance, wherein the at least one pending operation is performed by the pneumatic level control system (12) only when the present energy status of the vehicle battery (44) exceeds the energy requirement of the at least one pending operation by at least a first threshold value and a level of the vehicle is adjusted to an intermediate level, lying between a desired set level and the present vehicle level, such that the energy status of the vehicle battery (44) exceeds the first threshold value once the intermediate level has been reached in response to a determination that the at least pending operation exceeds the first threshold value.

2. The pneumatic level control system (12) as claimed in claim 1, wherein at least one of the at least one pending operation is a member of the group consisting of the level change of the motor vehicle and pressure accumulator filling.

3. The pneumatic level control system (12) as claimed in claim 1, wherein the first threshold value is lowered by an amount of energy being supplied to the vehicle battery (44) to determine an energy charge required for the at least one pending operation.

4. The pneumatic level control system (12) as claimed in claim 1, wherein the first threshold value is additionally determined taking into account an energy requirement of at least one further electrical energy consumer (48) of the motor vehicle (10).

5. The pneumatic level control system (12) as claimed in claim 1, wherein a second threshold value is set for the energy level of the battery, which value is greater than the first threshold value, and the pneumatic level control system (12) has only limited functionality when the energy level of the battery exceeds the first threshold value and is below the second threshold value.

6. The pneumatic level control system (12) as claimed in claim 5, wherein the level is adjusted to an intermediate level, lying between a desired set level and the present vehicle level, such that the energy status of the vehicle battery (44) exceeds the first threshold value once the intermediate level has been reached.

7. The pneumatic level control system (12) as claimed in claim 5, wherein the energy status of the vehicle battery (44) is determined and stored once the vehicle engine has been turned off, a third threshold value is fixable with reference to the energy status for the energy requirement admissible for the level control system (12), the sum of the energy consumed by the level control system (12) for the level changes to the portion of the vehicle and/or pressure accumulator filling operation(s) performed since the vehicle engine was turned off and of the energy requirement necessary for the pending level change to the portion of the vehicle and/or the pending pressure accumulator filling operation lies below the third threshold value.

8. The pneumatic level control system (12) as claimed in claim 1, wherein the battery voltage, the battery current or the battery power of the vehicle battery (44) is used as the threshold value.

9. A pneumatic level control method for a motor vehicle (10) having a vehicle battery (44) and a generator (46) supplying the vehicle battery (44), and an electrically operated compressor (18) with an electric motor (16), which compressor is assigned to the level control system (12), the electric motor (16) of the compressor (18) being supplied with power by the vehicle battery (44) and/or the generator (46) only under certain conditions, the method comprising the steps of determining in advance an energy requirement of the level control system (12) for at least one pending operation, determining a current energy status of the battery determining a first threshold value for an energy level of the battery, determining the energy status of the battery after performing the at least one pending operation, performing the at least one pending operation by the pneumatic level control system (12) responsive to determining that the energy status after performing the at least one pending operation exceeds the first threshold value;

setting a second threshold value for the energy level of the battery, which value is greater than the first threshold value responsive to a determination that the energy value after performing the at least one pending operation is below the first threshold value, and restricting the pneumatic level control system (12) to a limited functionality when the energy level of the battery exceeds the first threshold value and is below the second threshold value.

10. The method as claimed in claim 9, wherein at least one of the at least one pending operation is a member of the group consisting of level change of the vehicle and pressure accumulator filling.

11. The method as claimed in claim 9, further comprising the intermediate step of lowering the first threshold value by an amount of energy being supplied to the vehicle battery (44) to determine an energy charge required for the at least one pending operation before determining that the energy status after performing the at least one pending operation exceeds the first threshold value.

12. The method as claimed in claim 9, further comprising the intermediate step of raising the first threshold value by an amount of an energy requirement of at least one further electrical energy consumer (48) of the motor vehicle (10) before determining that the energy status after performing the at least one pending operation exceeds the first threshold value.

13. The method as claimed in claim 9, comprising the step of adjusting the level of a portion of the vehicle to an intermediate level between a desired set level of the vehicle and the present vehicle level, such that the energy status of the vehicle battery exceeds the first threshold value once the intermediate level of a portion of the vehicle has been reached.

* * * * *